United States Patent
Makar et al.

[11] Patent Number: 6,119,409
[45] Date of Patent: Sep. 19, 2000

[54] EXPANDED STRUCTURES AND METHOD FOR FORMING

[76] Inventors: Joseph Makar; Norma Makar, both of 7C Bluejay St., Lakehurst, N.J. 08733-1516

[21] Appl. No.: 09/334,594

[22] Filed: Jun. 17, 1999

Related U.S. Application Data

[60] Provisional application No. 60/129,634, Apr. 16, 1999.

[51] Int. Cl.[7] .................................................. E04B 1/343
[52] U.S. Cl. .............................. 52/67; 52/79.2; 52/79.3; 52/79.4; 52/79.5; 52/236.2; 52/236.4; 441/129; 441/81; 441/84
[58] Field of Search ............................ 52/18, 79.2, 79.3, 52/79.4, 79.5, 79.9, 64, 67 O, 71, 236.2, 236.4, DIG. 10; 446/478; 441/136, 126, 129, 81, 84; 40/610; 116/63 C, 63 P, 63 T; 404/9, 10

[56] References Cited

U.S. PATENT DOCUMENTS

| | | |
|---|---|---|
| 87,568 | 3/1869 | Johnson . |
| 1,390,102 | 9/1921 | Durham . |
| 2,846,731 | 8/1958 | Abler . |
| 3,088,559 | 5/1963 | Farnsworth et al. . |
| 3,119,154 | 1/1964 | Moore . |
| 3,496,904 | 2/1970 | Rimkus . |
| 3,820,299 | 6/1974 | Verholt . |
| 3,832,810 | 9/1974 | Johnston ...................................... 52/67 |
| 4,006,702 | 2/1977 | St. Cyr ...................................... 116/63 |
| 4,037,371 | 7/1977 | de la Lande de Calan . |
| 4,048,770 | 9/1977 | McKenzie, III . |
| 4,229,914 | 10/1980 | Lucas . |
| 4,256,050 | 3/1981 | Barnard ...................................... 116/63 |
| 4,258,514 | 3/1981 | St. Clair . |
| 4,277,922 | 7/1981 | McAllister . |
| 4,343,117 | 8/1982 | Shemitz . |
| 4,359,842 | 11/1982 | Hooker . |
| 4,489,306 | 12/1984 | Scolari ...................................... 340/107 |
| 4,517,251 | 5/1985 | Mosely . |
| 4,674,241 | 6/1987 | Sarrazin ...................................... 52/67 |
| 4,723,382 | 2/1988 | Lalvani . |
| 4,785,590 | 11/1988 | Jones ........................................... 52/64 |
| 4,875,310 | 10/1989 | Shaughnessy . |
| 4,937,987 | 7/1990 | Runyon . |
| 5,156,195 | 10/1992 | Wehler et al. ........................... 160/202 |
| 5,472,365 | 12/1995 | Engel . |
| 5,529,429 | 6/1996 | Pelegrin ....................................... 404/9 |
| 5,560,151 | 10/1996 | Roberts . |
| 5,613,798 | 3/1997 | Braverman .................................. 404/6 |
| 5,623,790 | 4/1997 | Lalvani . |
| 5,797,224 | 8/1998 | Gunthardt ................................. 52/79.4 |

FOREIGN PATENT DOCUMENTS

| | | |
|---|---|---|
| 1016266 | 1/1966 | United Kingdom . |

*Primary Examiner*—Carl D. Friedman
*Assistant Examiner*—Yvonne M. Horton
*Attorney, Agent, or Firm*—Richard C. Litman

[57] ABSTRACT

Expanded structures are formed by cutting a series of concentric rings or sections from a single block or sheet of solid material. The "rings" need not be circular, but may be any regular or irregular geometric or other shape as desired, so long as they are substantially concentric with one another. The cuts are made so that they angle outwardly from the upper to the lower surface of the block or sheet, and pass completely through the sheet or block. This provides a series of concentric sections, with each section having a lower, outer periphery which is at least slightly larger than the upper, inner periphery of the next larger adjacent section. This allows each section to be stacked atop a larger adjacent section, with the lower outer edge surface of each smaller section resting upon the upper inner edge surface of the larger section immediately therebelow. Alternatively, the tapered outer and inner walls or faces of adjacent sections may be wedged together, with an adjacent inner section protruding somewhat from the plane of its adjacent outer section. Such structures may be formed in virtually any practicable size, from utility sheds including door and window openings formed therein, to smaller household containers, works of art, etc. as desired. The structures may be made permanent by coating with a suitable material (e.g., glass fiber and resin, etc.) if so desired. Different colors of materials may also be assembled together, to produce structures having alternating bands of colors therein.

20 Claims, 11 Drawing Sheets

EXPANDED STRUCTURES AND METHOD FOR FORMING

REFERENCE TO RELATED PATENT APPLICATION

This application claims the benefit of U.S. Provisional Patent Application Serial No. 60/129,634, filed on Apr. 16, 1999.

BACKGROUND OF THE INVENTION

1. Field of the Invention

The present invention relates generally to structures for buildings and other objects, and to a method for forming such structures. The present method generally comprises forming a series of concentric sections or "rings" (not limited to circular peripheries) from a single mass of material, with the rings being cut such that their upper peripheries are smaller than their lower peripheries. Each successively smaller ring is then stacked atop the next larger ring, to form a completed structure which is expanded from the original solid block of material. Alternatively, each ring or section may be inserted within the next larger ring to extend outwardly therefrom, with the tapered respective inner and outer walls fitting closely together to form the structure.

2. Description of the Related Art

Innumerable means of forming and constructing various types of structures, hollow containers, etc. have been developed as need, materials, and human ingenuity have developed. Building or housing structures have generally been formed by constructing a frame and securing panels of material thereover, or by building up walls using smaller finite components (bricks, blocks, etc.). Smaller articles (pots, vessels, etc.) have been molded from clay, glass, etc., woven, or later formed from metal sheet material. These various construction methods are generally incompatible with one another for construction of articles of considerably different scale.

The present expanded structures and method for forming such structures is adaptable to the construction of various structures and other devices, regardless of the purpose or scale of the object to be constructed. Structures constructed according to the present method are formed from a single block of material, with very little or no wasted material after the block has been cut. The material is cut to form a series of concentric rings or sections of progressively smaller size, with each having the same shape. The cuts taper upwardly and inwardly about each section, so that the upper edge of each section or ring has a smaller periphery or circumference than the lower edge of that section. The angles of the cuts are adjusted so that the upper edge of a larger section has a periphery at least slightly smaller than and overlapping with the lower edge of the next smaller section. In this manner, each smaller section may be stacked atop each successively larger section, to form a hollow structure. Alternatively, the sections may be assembled with their mutually facing, tapered outer and inner walls fitting tightly together when an inner section is pushed outwardly from the plane of the next outer section.

The present expanded structures and method of construction thereof may be used for virtually any type of solid structure, from containers to building and/or storage structures. The material from which such expanded structures are formed, is preferably a soft, lightweight, easily cut substance, such as expanded foam plastic (polystyrene, etc.). The material may be coated with a suitable overlay (glass fiber cloth and resin, etc.) for durability, after its assembly.

A discussion of the related art of which the present inventor is aware, and its differences and distinctions from the present invention, is provided below.

U.S. Pat. No. 3,088,559 issued on May 7, 1963 to Lee P. Farnsworth et al., titled "Membranous Covering For Structural Devices And Fastening Means Therefor," describes a system for fastening a flexible covering to an underlying geodesic structure, as in covering a radar dome or the like. No construction of a hollow structure from a series of concentric sections cut from a single solid mass of material, is disclosed in the Farnsworth et al. U.S. Patent.

U.S. Pat. No. 3,119,154 issued on Jan. 28, 1964 to Kenneth A. Moore, titled "interchangeable Construction Elements And Method Of Using Same," describes a series of solid panels, with at least the base panel including a grid of square protuberances thereacross. The wall panels are wedged in rows defined by the raised squares to form a structure. The Moore elements cannot be used to form other than rectangular structures, and no means of constructing a hollow structure from a series of concentric rings cut from a single solid mass of material, is disclosed by Moore.

U.S. Pat. No. 3,820,299 issued on Jun. 28, 1974 to Johannes M. Verholt, titled "Kit For Assembling For Example A Piece Of Furniture, A Partition Or Toys From Panels And Strips," describes a series of edge connectors for connecting a plurality of solid, rigid panels together. As in the elements of the Moore U.S. Patent discussed immediately above, the Verholt connectors cannot be used to construct a hollow structure from a series of concentric sections cut from a single solid mass of material.

U.S. Pat. No. 4,037,371 issued on Jul. 26, 1977 to Yves J. O. de la Lande de Calan, titled "Construction Of Buildings By Assembling Prefabricated Elements," describes various embodiments of structural members for assembling a framework forming a plurality of triangular elements. Each structural member has a right angle cross section, for assembling a solid structural panel thereto. No disclosure of the construction of a structure from a series of concentric sections cut from a single solid mass of material, is disclosed by de la Lande de Calan.

U.S. Pat. No. 4,048,770 issued on Sep. 20, 1977 to Alexander J. McKenzie, III, titled "Building Structure," describes a structural framework forming a series of equilateral triangles, for constructing a structure defining the upper portion of an icosahedron. McKenzie, III then secures a plurality of solid, rigid panels to the completed frame. McKenzie, III does not disclose any means for forming a structure from a series of concentric sections cut from a single solid mass of material, as provided by the present invention.

U.S. Pat. No. 4,229,914 issued on Oct. 28, 1980 to Raymond D. Lucas, titled "Building Structures," describes a structural framework having channels formed in facing edges of the elements thereof. The channels capture mating beaded edges of flexible sheets for covering the frame. Again, no structure formed of a series of concentric sections cut from a single solid mass of material is disclosed by Lucas, as provided by the present invention.

U.S. Pat. No. 4,277,922 issued on Jul. 14, 1981 to Jack G. McAllister, titled "Frame Assembly Apparatus And Method Of Making Same," describes a framework formed of a plurality of spring biased members, which form a frame structure when assembled. No covering means is disclosed, nor does McAllister describe any means of forming a solid structure from a series of concentric sections cut from a single solid mass of material, as provided by the present invention.

U.S. Pat. No. 4,258,514 issued on Mar. 31, 1981 to Alfred L. St. Clair, titled "Method And Means For Anchoring A Dismountable Building," describes a structure secured to the ground by screw type anchors secured to perimeter plates, to which the remaining structure is secured. As in the other prior art described herein, St. Clair does not describe the construction of a solid structure from a series of concentric sections cut from a single solid mass of material, as provided by the present invention.

U.S. Pat. No. 4,343,117 issued on Aug. 10, 1982 to Norman S. Shemitz, titled "Assemblable Structures," describes structures formed of a series of rigid, solid panels having collars or clips at each of the corners thereof. An elastic cord (e.g., bungee cord) is secured about adjacent collars or clips to secure the panels together. The Shemitz system does not provide for the construction of a solid structure from a series of concentric sections cut from a single solid mass of material, as provided by the present invention.

U.S. Pat. No. 4,359,842 issued on Nov. 23, 1982 to Rea F. Hooker, titled "Trapezoidal Structures," describes a large series of geodesic structures all employing a plurality of solid trapezoidal panels which are secured together along one or more common edges. Hooker does not disclose any means of constructing a solid structure from a series of concentric sections cut from a single solid mass of material, as provided by the present invention.

U.S. Pat. No. 4,517,251 issued on May 14, 1985 to Jeannine Mosely, titled "Blank For Folding An Octahedron And Folded Product," describes a method of folding a three dimensional regular octahedron from a single regular hexagonal sheet. The sheet must be flexible (paper, thin plastic, foil, etc.) in order to allow the various sections thereof to be bent and folded as required. As in the case of the other structures of the prior art of which the present inventor is aware, Mosely does not disclose the formation of solid structure from a series of concentric sections cut from a single solid mass of material as provided by the present invention.

U.S. Pat. No. 4,723,382 issued on Feb. 9, 1988 to Haresh Lalvani, titled "Building Structures Based On Polygonal Members And Icosahedral," describes various means of constructing three dimensional regular and irregular polyhedral structures from a series of three and four sided polygonal surfaces. No structure formed of a series of concentric sections cut from a single solid mass of material is disclosed by Lalvani.

U.S. Pat. No. 4,875,310 issued on Oct. 24, 1989 to Ernest P. Shaughnessy, titled "Modular Building," describes the construction of various three dimensional structures from a series of irregular polygonal sheets of material. As such, the system of the Shaughnessy '310 U.S. Patent bears a closer resemblance to the means of forming structures disclosed in the de la Lande de Calan '371 and Lalvani '382 U.S. Patent, than to the present invention with its series of concentric sections formed from a single solid mass of material.

U.S. Pat. No. 4,937,987 issued on Jul. 3, 1990 to John F. Runyon, titled "Temporary Building Structure," describes the formation of a three dimensional structure from a pair of trapezoid shaped sheets and a square. The resulting polyhedral configuration is more closely related to the other patents of the prior art cited herein, than to the present invention with its series of concentric sections formed from a single solid mass of material.

U.S. Pat. No. 5,472,365 issued on Dec. 5, 1995 to Richard J. Engel, titled "Polygon Attachment System For Constructing Polyhedra," describes a series of polygonal shapes and cylindrical connectors for connecting the polygons together along adjacent edges. Each of the polygons includes a pair of opposed fingers along each edge, which fit into depressions in the ends of the cylinders. As such, the structures assembled from the Engel disclosure more closely resemble other polygonal and polyhedral structures of the prior art, than they resemble the present invention.

U.S. Pat. No. 5,560,151 issued on Oct. 1, 1996 to Peter A. Roberts, titled "Building Blocks Forming Hexagonal And Pentagonal Building Units For Modular Structures," describes means of constructing polyhedral structures from a series of panels, with the panels in turn each being formed of either six or five triangular panels. As in the case of other polyhedral structures cited herein, the Roberts system bears a closer resemblance to those other systems than to the present invention with its series of concentric sections formed from a single solid mass of material.

U.S. Pat. No. 5,623,790 issued on Apr. 29, 1997 to Haresh Lalvani, titled "Building Systems With Non-Regular Polyhedra Based Upon Subdivisions Of Zonohedra," describes structures formed of various polygonal frame members which define the structures. The structures of the Lalvani '790 U.S. Patent more closely resemble those disclosed in the '382 U.S. Patent to the same inventor, discussed further above, than they do any structures formed according to the method of the present invention.

Finally, British Patent Publication No. 1,016,266 published on Jan. 5, 1966 to Kotaro Tonouchi, titled "Improvements In Pre-fabricated Building Structures," describes the construction of a generally arched roof from a plurality of triangular frame members. The resulting geodesic structure bears no resemblance to structures formed by the method of the present invention, with its series of concentric sections formed from a single solid mass of material.

None of the above inventions and patents, taken either singly or in combination, is seen to describe the instant invention as claimed.

SUMMARY OF THE INVENTION

The present invention comprises the forming of expanded structures from one or more solid blocks of material. The block is cut through from the upper to the lower surface to form a series of concentric "rings" or sections. The "rings" need not be circular, but may be in virtually any regular or irregular geometric or other shape, as desired. The cuts through the block are angled outwardly from the first (e.g., upper) to the opposite second (e.g., lower) surface, so that the first periphery of each section is at least slightly smaller than the second periphery of the same section. The sections are then disassembled after cutting, with each section being stacked atop the section which was cut immediately outwardly therefrom. The sections are stackable in this manner, because the first periphery of each section is slightly smaller than the adjacent second periphery of the section stacked immediately thereabove, so that the adjacent peripheries overlap with each section resting upon the section below.

The tapered inner and outer walls of the various concentric sections permit an alternative assembly, as well. The width of the cut between each section provides some space between each concentric section, when they remain in the same plane. However, when an inner section is pulled from the plane of the outer section in the direction of the inward taper, it will be seen that the wider portion of the second periphery of the inner section, will wedge within the narrower portion of the first periphery of the outer section. This interference fit may be used to secure the sections together, or the sections may be secured together using other mechanical, adhesive, and/or other means as desired.

Exemplary structures may be formed from lightweight materials, such as relatively rigid foam plastics (e.g., Styrofoam, tm), although other materials may be used as desired. The present structures and method of forming such structures lends itself to the construction of structures of virtually any practicable size, from utility storage sheds or the like formed from one or more eight foot square blocks, to various household containers and decorative articles formed from smaller blocks. Permanent structures (e.g., light boats, surfboards, etc.) may be formed by applying an outer and/or inner coating (e.g., glass fiber and resin, etc.) over the assembled structure, if so desired.

Accordingly, it is a principal object of the invention to provide improved expanded structures wherein a series of concentric sections are cut from a single solid block of material, with each of the sections having an upper periphery which is slightly smaller than its lower periphery, with the sections then being stacked atop one another to form an expanded, hollow structure.

It is an equally important object of the invention to provide improved expanded structures wherein a series of concentric sections are cut from a single solid block of material, with each of the sections having an upper periphery which is slightly smaller than its lower periphery, with the successive smaller or inner sections then being pulled from the plane of successive larger or outer sections to form an expanded, hollow structure.

It is another object of the present invention to provide a method for forming such structures, by cutting a plurality of sections from a single block of material and assembling the sections in one of the manners described above to form a structure.

It is an additional object of the invention to provide an improved method for forming expanded structures wherein the concentric sections may comprise any practicable regular or irregular geometric or other shape as desired.

It is a further object of the invention to provide an improved method for forming expanded structures wherein the material comprises a foam plastic, with permanent structures being formed by applying an outer and/or inner coating as desired.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a variety of expanded structures which may be formed from a solid block of material, as well as a method for forming such structures. The method basically comprises the cutting of a series of concentric "rings" or sections from a block of material, with the cuts being made so the bottom edges of each section are wider than the upper edges of the next larger section. In this manner, the sections may be stacked atop one another, with the larger bottom edges resting upon at least a portion of the smaller top edge of the next larger section. Alternatively, the sections may be assembled by pushing an inner section or ring from the plane of the adjacent outer section in the direction of the narrower edges of the sections, so the smaller section wedges within the larger section and protrudes from the plane of the larger section.

Figure 1:
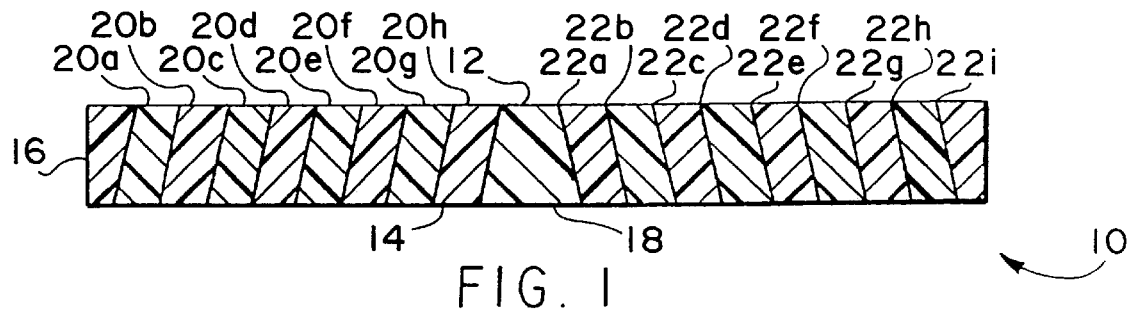
FIG. 1 is a cross section elevation view of a sheet or block of solid material, showing the cuts made therein for forming the concentric sections of a structure according to the present method.
Figure 2:
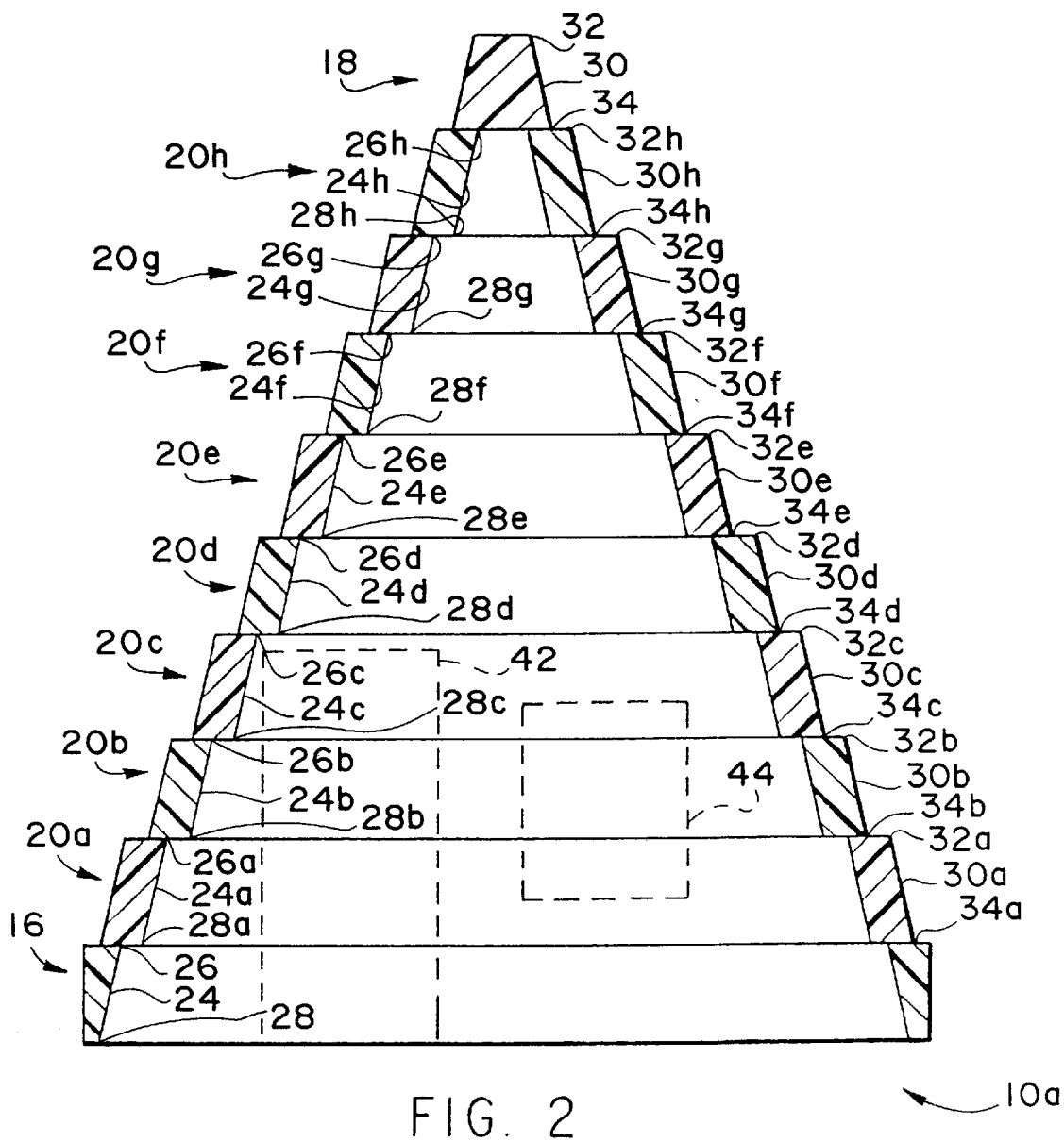
FIG. 2 is an expanded structure formed according to the present method, using the sections cut from the block of FIG. 1.

FIGS. 1 and 2 illustrate the basic principle involved in the present construction method. In FIG. 1, a single block or sheet of material 10, having a first surface 12 and opposite lower surface 14, has been cut by a series of concentric cuts to form a series of concentric sections or "rings," as shown in cross section in FIG. 1. The sections comprise an outermost section 16, an innermost section 18, and one or more intermediate sections separated by a series of cuts. In the case of the block 10 of FIG. 1 and resulting structure 10*a* of FIG. 2, a total of eight intermediate sections 20*a* through 20*h* are provided, with a total of nine cuts 22*a* through 22*i* being made through the block 10 to separate the various sections. Each of the cuts passes completely through the block 10 from the first surface 12 to the opposite second surface 14, and is tapered outwardly from the first surface 12 to the second surface 14 of the block 10.

FIG. 2 illustrates an exemplary structure 10*a* which may be constructed of the various sections 16 through 20*h* of the block 10 of FIG. 1. It will be seen that, due to the angularly tapered orientation of the cuts 22a through 22i, that the outermost section 16 (the bottom section in FIG. 2) has an inner wall 24 with an upper periphery 26 which is smaller than its lower periphery 28. In a similar manner, the innermost section 18 (the top section in FIG. 2) has an outer wall 30 with an upper periphery 32 which is smaller than its opposite lower periphery 34. The various intermediate sections 20a through 20h each have inner walls, respectively 24a through 24h, with upper peripheries, respectively 26a through 26h, which are smaller than their opposite lower peripheries, respectively 28a through 28h. In a similar manner, the intermediate sections 20a through 20h also have outer walls, respectively 30a through 30h, with upper peripheries, respectively 32a through 32h, which are smaller than their opposite lower peripheries, respectively 34a through 34h.

In FIG. 2, the various sections 16 through 20h have been separated from one another along their cuts 22a through 22i, and have been stacked atop one another to form a hollow, expanded structure 10a. Due to the relatively narrower upper, inner periphery of each successively larger section, e.g., the upper, inner periphery 26 of the outermost section 16, the outermost sections are successively lifted from the adjacent inner sections for separating the various sections 16 through 20h from one another.

Thus, the outermost section 16 is first lifted from the block 10 after the cuts 22a through 22i have been made, and positioned as desired. The next or largest intermediate section 20a is then lifted from its inner adjacent intermediate section 20b and stacked concentrically atop the outermost section 16. The relatively larger outer and bottom periphery 34a of the intermediate section 20a, compared to the relatively smaller inner and top periphery 26 of the outermost section 16, results in at least a portion of the second or lower surface 14 of the largest intermediate section 20a bearing against the adjacent first or upper surface 12 of the outermost section 16. The next intermediate section 20b is then stacked concentrically atop the largest intermediate section 20a, and so forth, with the innermost section 18 finally being stacked concentrically atop the upper surface 12 of the smallest intermediate section 20h to complete the structure 10a of FIG. 2.

Figure 3:
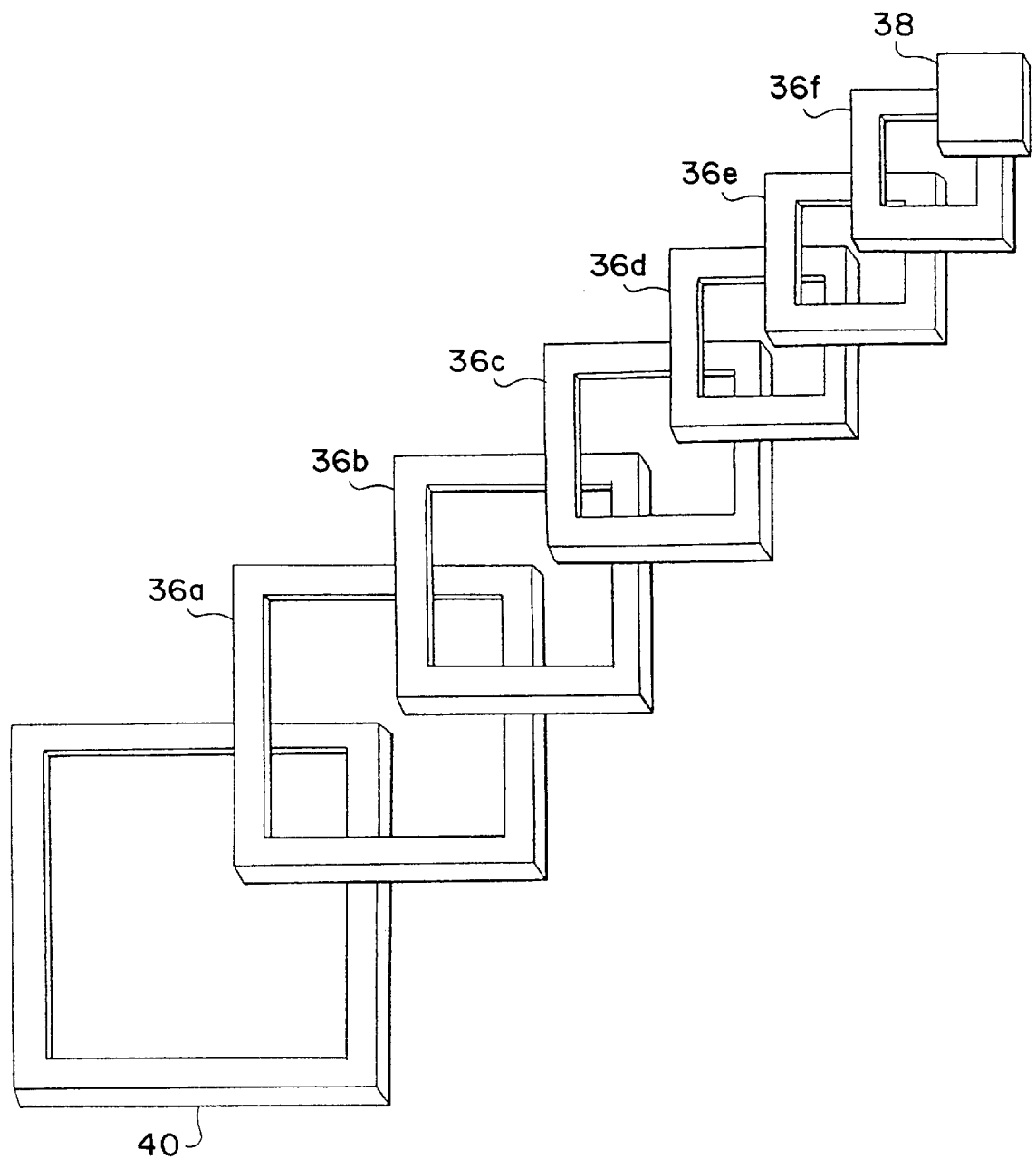
FIG. 3 is an exploded perspective view of a series of sections cut from a single block of material, and separated from one another after cutting.

FIG. 3 provides a further illustration of the components which may be formed from a square block or sheet of material, as exemplified in FIGS. 1 and 2. While two fewer sections are shown in FIG. 3, the principle remains the same as that discussed above for FIGS. 1 and 2. In FIG. 3, the intermediate sections 36a through 36f and innermost section 38 have been separated from the outermost section 40, and arranged with each successively smaller section overlying the next larger section from which the smaller section was cut. The relatively larger outer bottom edges rest upon the relatively smaller inner and upper edges of each successively larger section when the sections 36a through 40 are assembled, as in the structure of FIG. 2.

It will be seen that the thickness of the block or sheet 10 may be varied as desired, and that the distance between cuts, and thus the thickness of the walls of the outermost section and each of the intermediate sections, may also be varied as desired. The height of each of the sections in FIG. 2, corresponding to the thickness of the block 10 of FIG. 1, and the wall thickness of each of the sections of the structure 10a of FIG. 2, have been exaggerated in order to provide greater clarity in the drawing Figures. The aspect ratio (i.e., height v. width) of any structures formed according to the present method, may be varied by adjusting the thickness of the block and distance between cuts.

It will also be noted that the present method may be used to form structures sufficiently large for the storage of various articles therein, and/or to provide living or other quarters for persons as desired. As an example of the above, a block of material having lateral dimensions of eight by eight feet, and one foot thick, may be used to form a storage shed or other structure having a base eight feet across, and a height of eight feet by making a total of seven concentric cuts through the block. While the structure will taper somewhat toward the top, the taper may be relatively slight, depending upon the angle of the cuts and the thickness of the walls of each section, i.e., the distance between cuts. If the distance between cuts is relatively small, e.g., on the order of two inches, then the structure will taper toward the top only fourteen inches (the difference between the first and eighth sections) on each side, for a total height of eight feet.

This would result in a relatively thick center or roof section spanning the structure. Accordingly, the innermost section, which still has a width of nearly six feet and a thickness of one foot, may be cut laterally to have a lesser thickness, e.g., perhaps only two inches. This two inch thick section may then be cut from its upper to its lower surface in the manner described further above, to provide a roof structure having a shallower angle (e.g., forty five degrees, in the case of a two inch thick section having successive cuts therethrough spaced two inches apart). The remaining material may be used to form further structures as desired.

It will be seen that the above described method results in very little wasted material, with smaller structures being used for containers, smaller storage sheds or the like, pet shelters (e.g., dog houses, bird houses, etc.), planter boxes, flower pots, etc. The use to which structures formed using the present method may be placed, is virtually unlimited. Hence, for a larger structure formed by the exemplary eight by eight by one foot section of material, door and window passages, respectively 42 and 44 in the structure 10a of FIG. 2, may be cut through the finished structure as desired. The various sections of structures constructed in accordance with the present method may be secured together by various means, e.g., any suitable conventional adhesive, and/or the inner and/or outer surfaces may be coated with a protective coating as desired (e.g., fiber glass and resin, etc.). The structures may be painted or decorated as desired.

Figure 4:
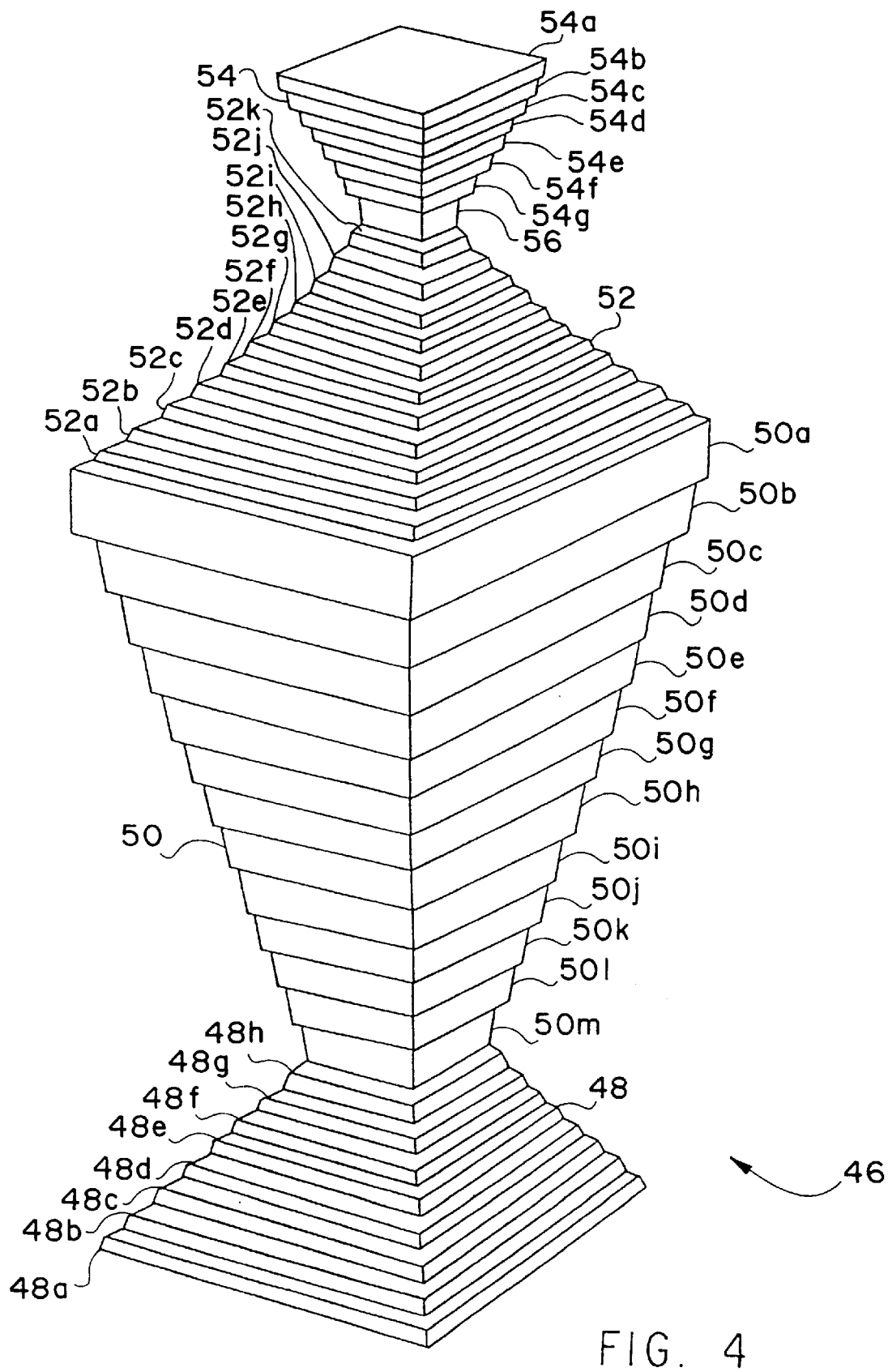
FIG. 4 is a work of art formed according to the present method.

FIG. 4 illustrates a different type of structural article 46 which may be constructed in accordance with the present method. A pedestal, vase, or other work of art may be constructed in a manner similar to that discussed further above, by using a smaller and thinner block of material (perhaps a smaller leftover block from a larger project). The article 46 may be formed of more than a single block or sheet of material, or sub-block cut from a block of greater thickness. The art work or article 46 of FIG. 4 is formed of a series of different sheets having different thicknesses, with each of the sheets being designated by a different reference numeral and sections cut from the same sheet being designated by the same numeral with different alphabetic subcharacters in order to distinguish between components.

The base portion 48 is formed of a thin sheet of material (as evidenced by the relatively thin nature of each section forming the base 48), comprising a series of progressively smaller sections 48a through 48h, in the manner of the structure 10a of FIG. 2. The intermediate section 50 is formed of a thicker block than the base section 48, and comprises a series of progressively larger sections 50a through 50m, with the smallest section 50m being the lowermost section. It is noted that the principle involved in constructing the intermediate section 50 of the art structure 46 is the same as that used in constructing the structure 10a of FIG. 2, but the sections are inverted, with the largest section 50a positioned at the top of the intermediate portion 50, and the smallest section 50m being positioned at the bottom of the intermediate portion.

The upper portion 52 of the structure 46, comprising sections 52a through 52k, is constructed in a manner similar to that used in the construction of the base portion 48 of the structure 46. The cap portion 54, comprising sections 54a through 54g, is constructed in a manner similar to that of the intermediate portion 50, but is formed of a relatively thinner sheet of material. A relatively thicker joint portion 56, disposed between the upper portion 52 and the cap portion 54, may be formed of a center piece cut from the center of the lowermost intermediate section piece 50m, if desired, as the sections 50a through 50m are formed from relatively thicker material than that used for the construction of the other portions 48 through 54 of the art work 46. It will also be seen that the uppermost or widest section 54a may have its center area removed, to provide access to the interior volume of the expanded structure 46, for using the structure 46 as a vase or other container, etc.

Figure 5:
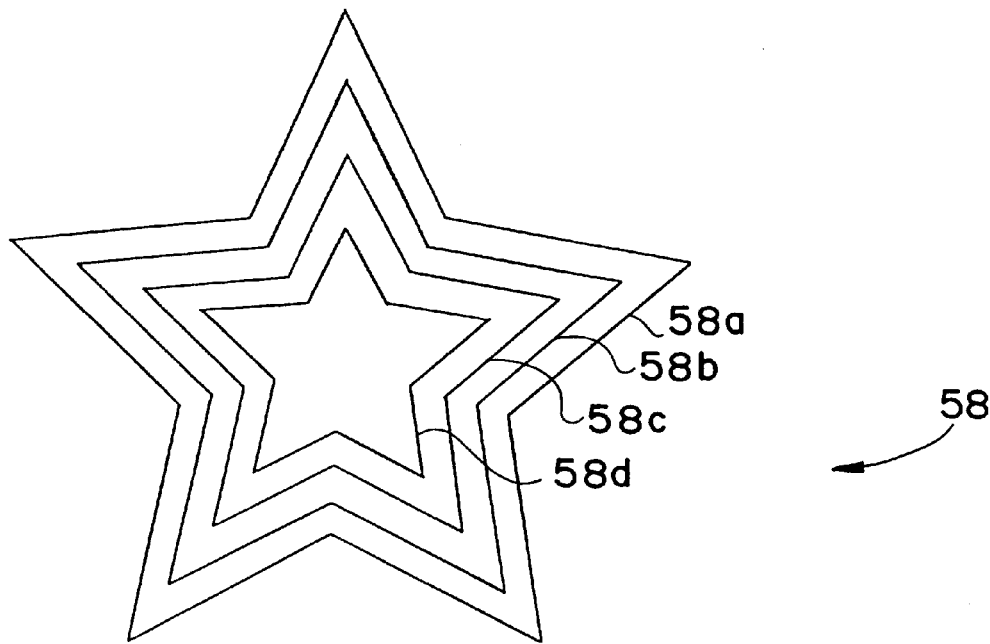
FIG. 5 is a plan view of an exemplary structural shape formed according to the present method.
Figure 6:
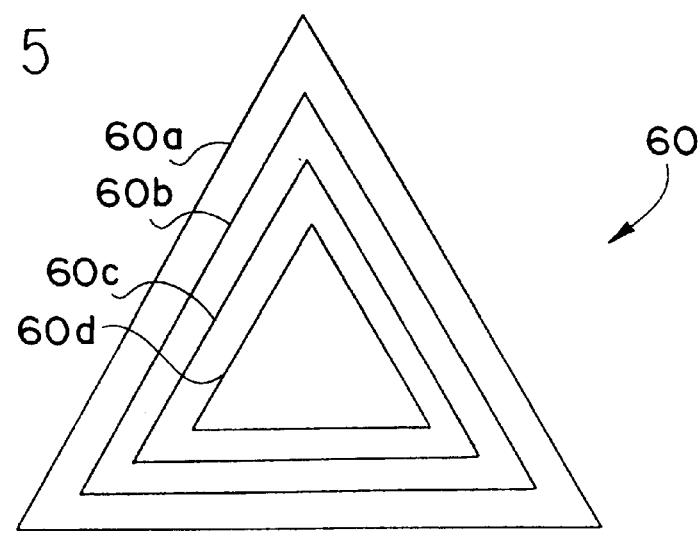
FIG. 6 is a plan view of another exemplary structural shape formed according to the present method.
Figure 7:
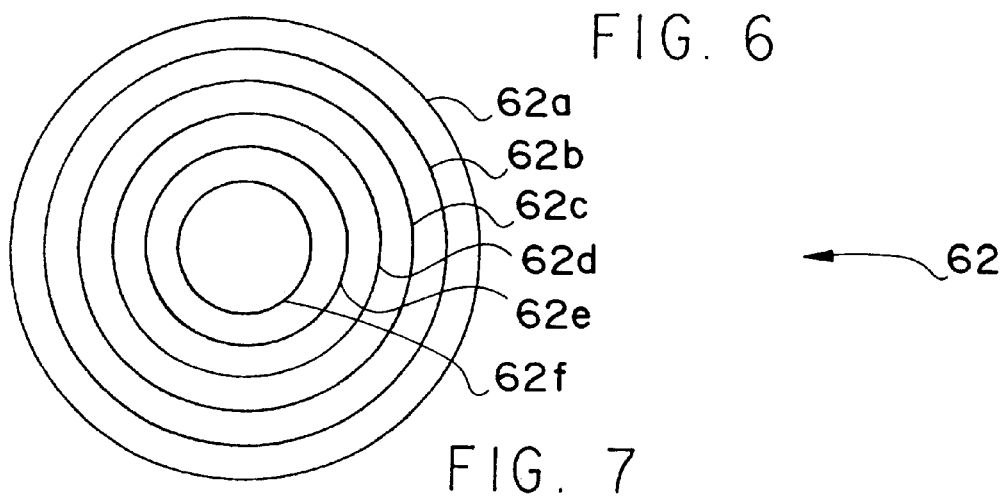
FIG. 7 is a plan view of yet another exemplary structural shape formed according to the present method.

To this point, the basic sheets or blocks of material used for the construction of the exemplary structures of FIGS. 1 through 4, have been square. However, it will be seen that the shapes of structures formed using the present method, need not be square or even rectangular, but may comprise virtually any shape desired. Accordingly, FIGS. 5 through 7 illustrate different exterior shapes which may be formed using the present method. FIG. 5 discloses a five pointed star 58, comprising sections 58a through 58d, while FIG. 6 illustrates a triangle 60, formed of sections 60a through 60d. FIG. 7 shows a circle 62, formed of elements 62a through 62f. Other shapes may be provided as desired.

Figure 8:
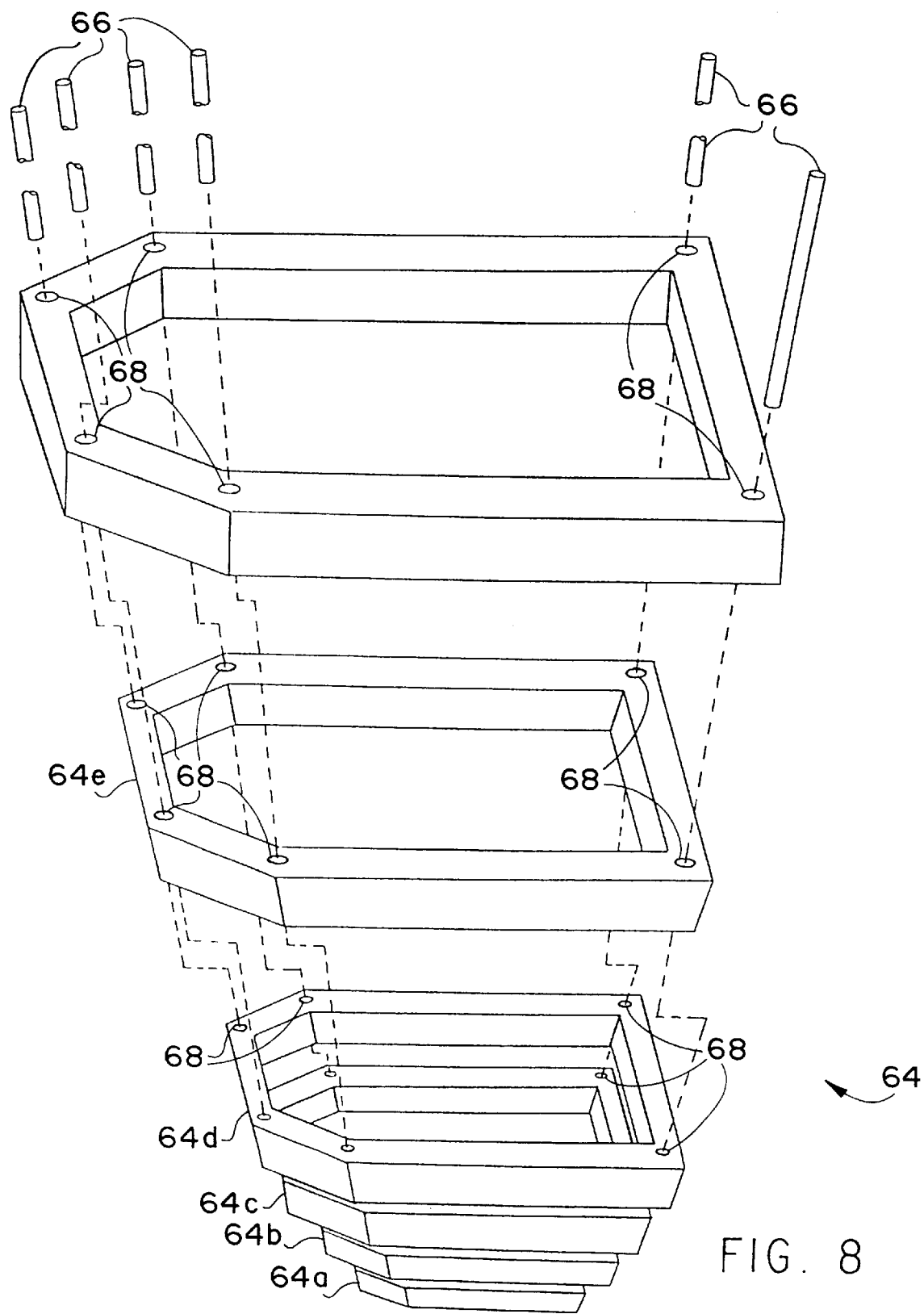
FIG. 8 is an exploded perspective view of a boat type structure formed according to the present method, showing the removable installation of sections thereto for enlarging or reducing the size of the structure as desired.

In accordance with the above noted various different shapes to which the present method may be applied, FIG. 8 illustrates an exploded view of a boat-like or surfboard-like structure 64 which may be constructed using the present method. Such a boat or surfboard structure 64 may be formed of a generally rectangular block or sheet of material, with the forward corners removed to make a relatively smaller bow area, as shown. It will be seen that the present method of forming expanded structures may be used to form a boat or surfboard structure including curved sides and a pointed bow, in the manner of a more conventional boat shape, if so desired, merely by shaping the exterior of the block or sheet from which the structure is to be cut, before cutting the concentric sections from the block or sheet.

The boat type structure 64 of FIG. 8 comprises a relatively small bottom section 64a, which is cut from a slightly larger section 64b, and so on, through the increasingly larger sections 64c through the largest section 64f, as shown. Fewer or additional sections may be formed as desired. The various sections 64a through 64f are cut concentrically from one another, with the cuts tapering angularly in order that the slightly larger periphery of the second surface of each section bears against the slightly smaller periphery of the first surface of the adjacent section, in the manner described further above for the structure illustrated in FIG. 2. However, it will be seen that the various sections 64a through 64f are inverted for the flotation structure 64 of FIG. 8, thus creating a structure having a relatively wide open top.

It has been noted further above that the various sections may be permanently assembled by applying a conventional glass fiber or other flexible coating thereover, to the exterior and/or interior surface(s) of the structure, and hardening the coating in place by means of a suitable conventional resin applied over the structure and glass fiber or other material, as is known in the art of constructing boats, aircraft, and other structures of composite materials. Such a structure cannot be readily disassembled. However, it is also possible to apply such a permanent protective coating separately to each section to protect the various sections from the environment, and still allow the sections to be disassembled as desired. Such individually protected sections would still provide the durability required to survive a relatively harsh outdoor environment, but would still provide for compact storage as desired.

The pre-coated sections of such a structure may still be secured together by other means, such as the multiple pins 66 and mating holes or passages 68 formed through the various sections 64a through 64f. The passages 68 are formed concentrically through various points of the various sections of the structure when they are assembled together, so that each passage consists of a series of short passages through each section which are in alignment with one another, in order to accept a pin or rod 66 therethrough. This assembly means allows the various sections to be assembled to quickly create a structure as small or as large as desired, to meet the purpose or need of the immediate moment.

Figure 11:
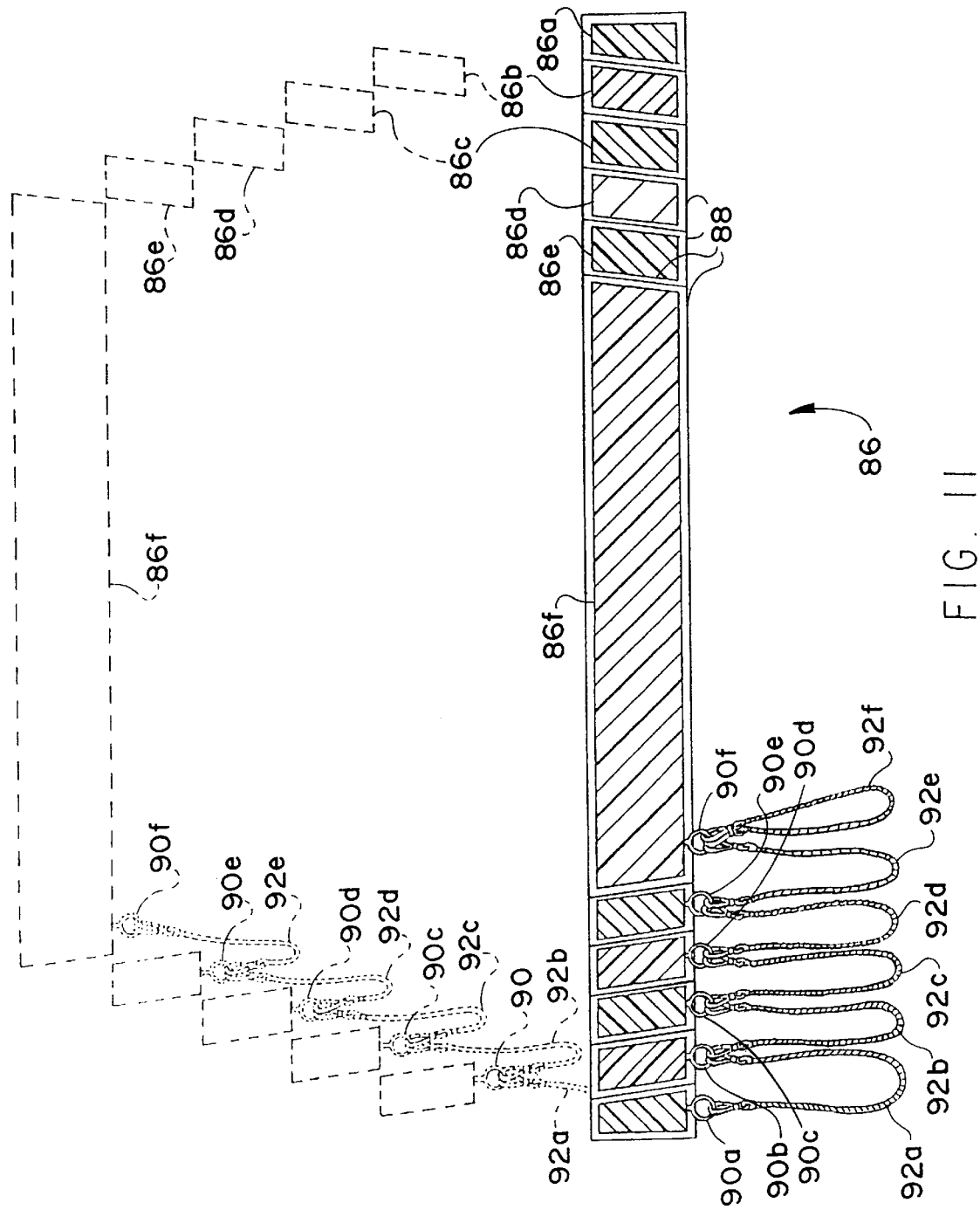
FIG. 11 is an elevation view in section of a multiple section structure formed in accordance with the present invention, for use as a life preserving device.
Figure 12:
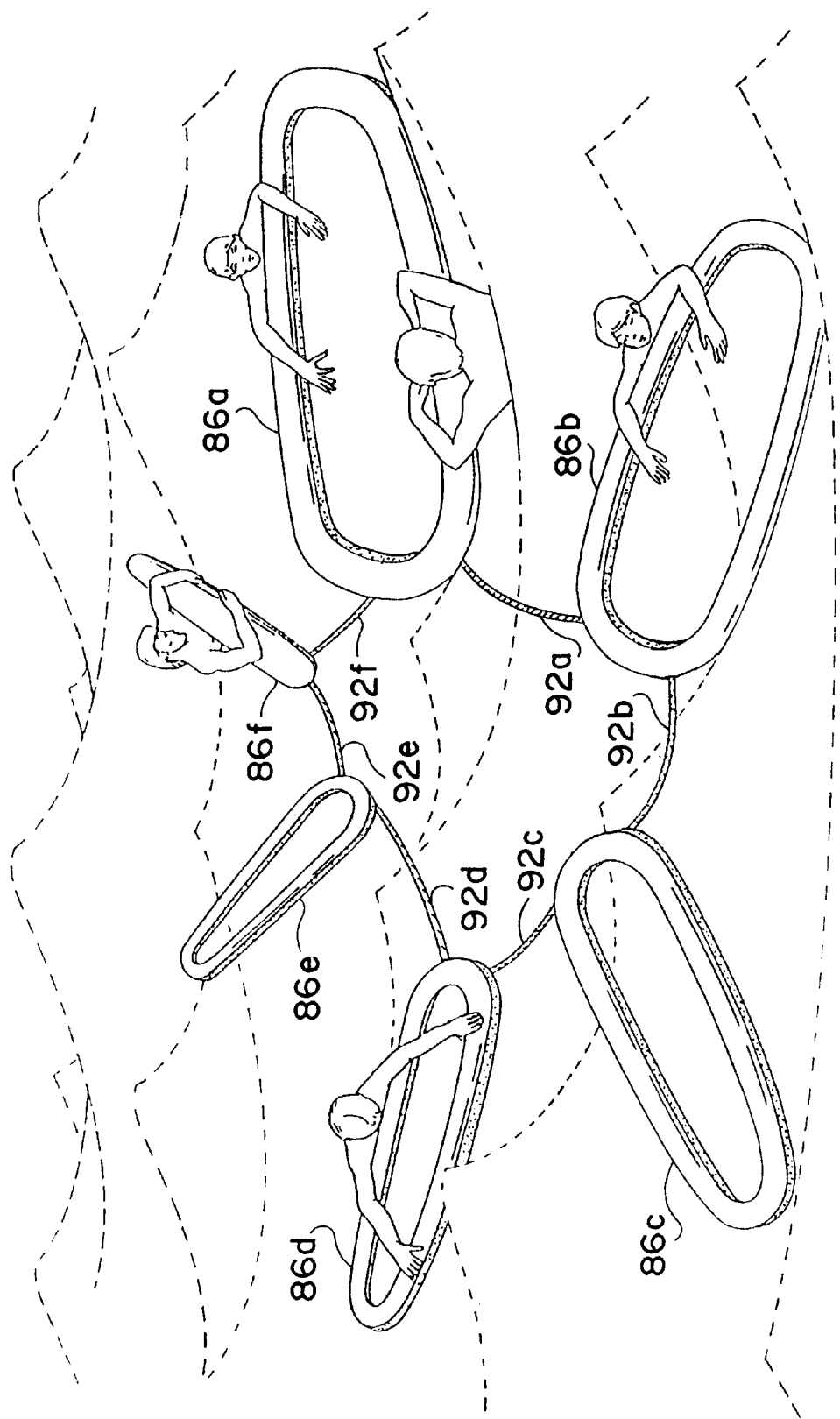
FIG. 12 is an environmental perspective view of the structure of FIG. 11, in use.

In the case of a boat or surfboard-like structure 64, a relatively small partial structure, e.g., sections 64a through 64c, may remain assembled for most use. Such a structure could be of great value in life saving operations, where a solitary swimmer requires rescue. On the other hand, additional sections such as 64d through 64f could be quickly assembled to the base structure comprising sections 64a through 64c, in order to provide greater capacity for the rescue of additional victims of a boating accident or other emergency involving several people in the water. Other rapid assembly and disassembly means may be provide as desired. Another embodiment of such a watercraft is illustrated in FIGS. 11 and 12 of the drawings, and discussed in detail further below.

Figure 9:
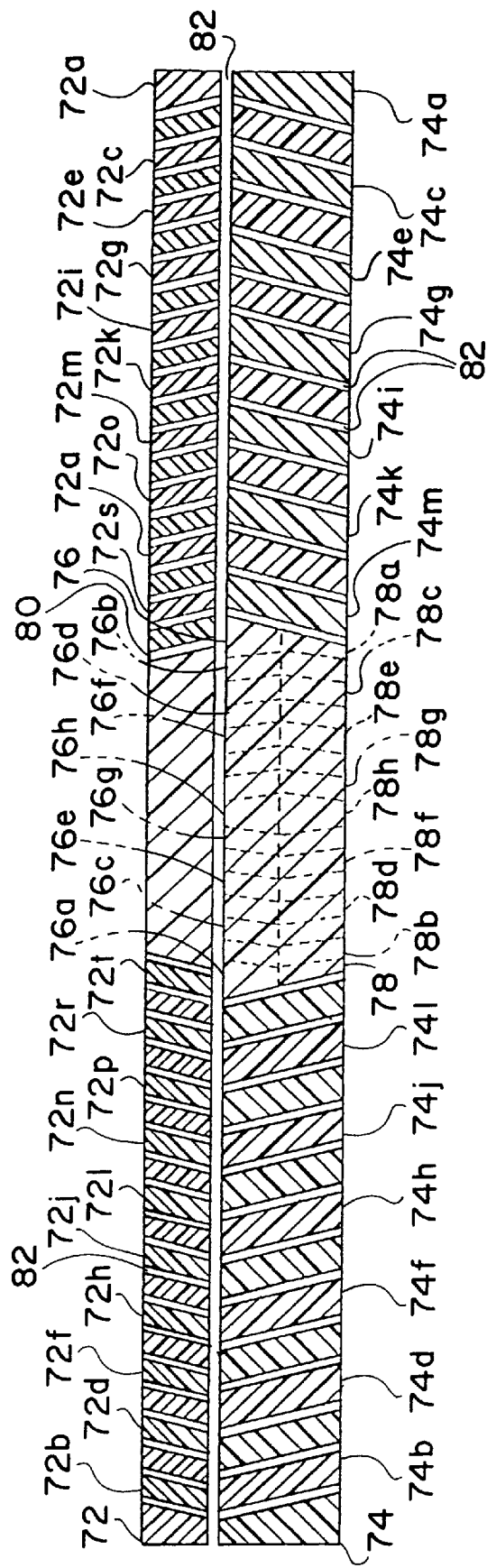
FIG. 9 is an elevation view in section of a sheet or block of material which has been cut to form the structure of FIG. 10.

FIGS. 9 through 14 illustrate a slightly different means of forming an expanded structure from a block of solid material, in accordance with further embodiments of the present invention. In FIG. 9, a block of material 70 has first been cut to form two layers of material, respectively 72 and 74, with the first layer 72 having a thickness on the order of one half that of the second layer 74. Each layer has a first surface, respectively 76 and 78, and an opposite second surface, respectively 80 and 82, with the opposite first and second surfaces being parallel to one another.

The cuts which separate the block 70 into two or more layers, e.g., first and second layers 72 and 74, are accomplished before any further cuts are made to divide each layer into a series of sections or rings. This is because the sections formed from each layer are not necessarily equal in lateral thickness, as indicated by the relatively thin sections 72a through 72t as compared to the thicker sections 74a through 74m. The division and separation of the block 70 into the desired number of layers before forming the individual segments of each layer, enables the cutting tool to be passed completely through the respective layer without damaging the material which would be a part of an adjacent layer.

The first or thinner layer 72 is then cut into a series of concentric sections or rings, respectively 72a through 72t, and the second or thicker layer 74 is also cut into a plurality of sections, respectively 74a through 74m. (It will be seen that the reference characters used to indicate each successive section are placed alternatingly to each side of the block 70 of FIG. 9, for clarity in the drawing Figure. This is possible due to the concentric nature of each of the sections, with it being understood that each section continues about the plane of the block 70 to each side of the center of the block.) These cuts are made in the manner described above in the embodiments of FIGS. 1 through 8, with the cuts tapering inwardly from one side of each layer, toward the opposite side of the respective layer to form an outermost section, e.g., 72a, an opposite innermost section, and a series of intermediate sections 72b through 72t therebetween.

Each of these sections has an outermost wall and an opposite innermost wall, in the manner of the expanded sections 16 through 20h used to form the structure 10a of FIG. 2 and discussed further above. These first and second surfaces and inner and outer walls define the peripheral edges of each section, in a manner similar to that of the sections of the structure 10a of FIG. 2.

Additional segments or sections may be formed optionally from the remaining core portions of the two layers 72 and 74, if so desired. In FIG. 9, broken lines are used to show the division of the core of the thicker second layer 74 into two sub-layers, respectively 76 and 78, with the two sub-layers 76 and 78 being optionally cut into a further series of segments, respectively 76a through 76g and a core 76h for the first sub-layer 76, and 78a through 78g and a core 78h for the second sub-layer 78. In a similar manner, the core 80 of the first layer 72 may be further divided, if so desired.

The various cuts used to form the various sections or segments of the block or sheet 10 of FIG. 1 are not shown to have any finite width or thickness, in and of themselves. This was done for clarity in the drawing Figure. In reality, the thickness of the cutting implement used (e.g., knife, hot wire, etc.) will cause a slight gap or space to be formed between each layer and between each segment of each layer, as indicated by the gaps 82 shown between segments and layers in FIG. 9. These gaps 82 enter into the construction of various articles in accordance with a further assembly embodiment, discussed below.

Figure 10:
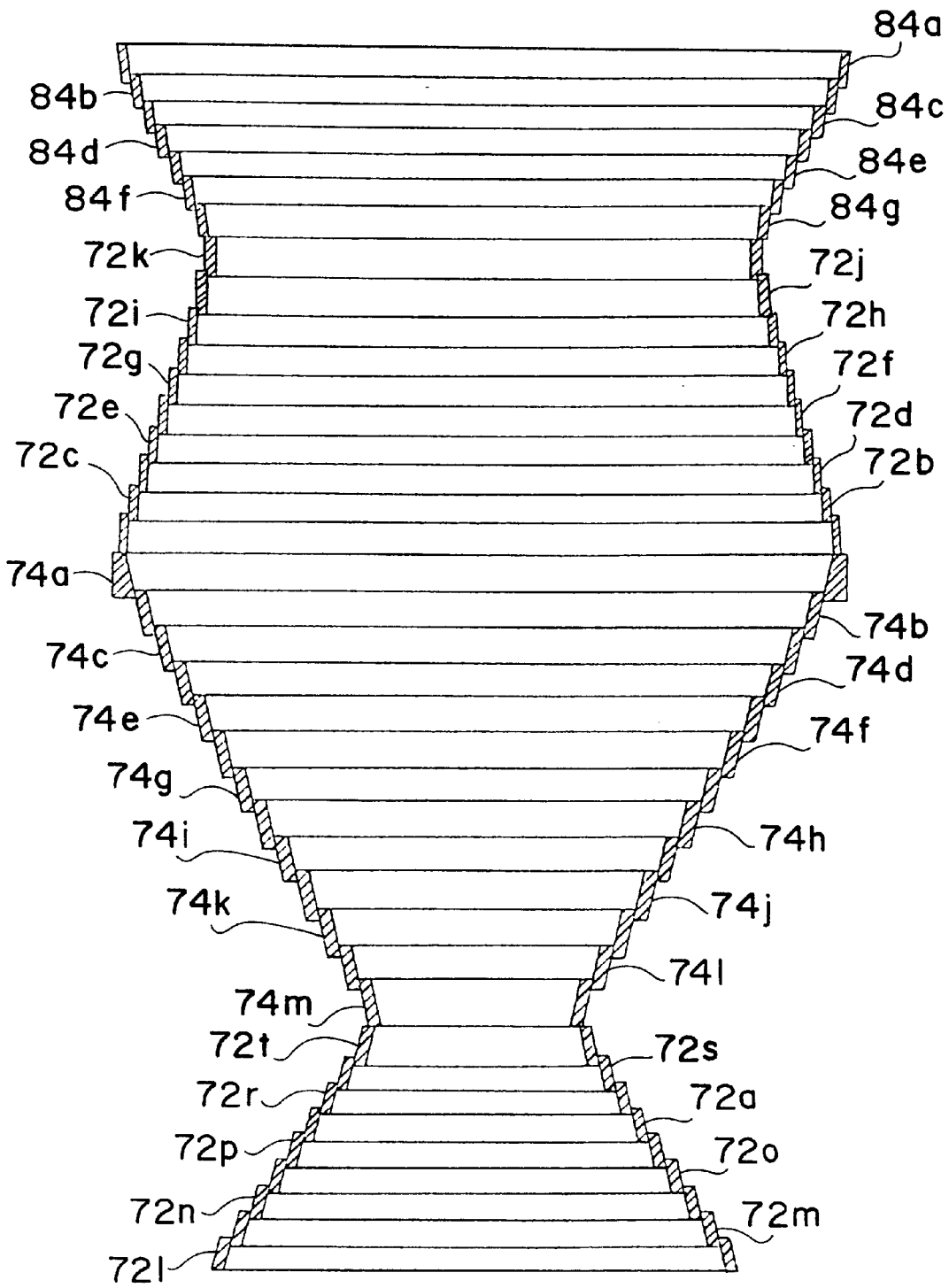
FIG. 10 is a cross section elevation view of a vase type structure which has been formed using the sections cut from the block according to FIG. 9.

FIG. 10 illustrates the construction of a vase 70a which has been formed by the expansion of the various sections cut from the block 70 of FIG. 9, discussed above. In FIG. 10, the various segments or rings cut from each section of the base block or sheet of material 70, have been separated and expanded to form a completed vase 70a. The various adjacent sections have been expanded from their initial coplanar state, so that each successive ring or segment is at least somewhat displaced from the plane of the adjacent ring or segment. The various rings or segments tend to "lock" in such a relationship, as the relatively wider periphery of one surface, as compared to the opposite surface, interferes with the relatively smaller periphery of the next adjacent larger ring or segment. The segments or rings of the present expanded structures do not truly telescope relative to one another, as they are not cylindrical in section. The tapered configuration of each segment or ring, causes the segments or rings to "jam together" to a certain extent when the segments are expanded from their initial coplanar state.

The vase structure 70a of FIG. 10 is constructed essentially of four different groups of consecutively larger and smaller segments or rings, with each of the groups being taken from the segments formed from the single solid block or sheet 70 of FIG. 9. It will be seen that two or more such groups may be formed from a single layer of rings or segments cut from the block or sheet 70, if so desired, and in fact such rings may be staggered to alternately increase and decrease in diameter, if so desired.

The first, lowermost group forming the base of structure 70a, and the third or penultimate group of structure 70a, are each taken from the first or upper layer 72 of the block 70. This results in the innermost section of each group, e.g., the smallest section 72t of the base group, extending partially above the plane of the next largest intermediate section 72s, and so on, with the second largest base section 72m extending above the plane of the largest base section component 72l. Similarly, the smallest segment 72k of the third group extends above the plane of the next larger segment 72j, and so forth, with the second largest segment 72c extending above the largest segment 72b of the group. Thus, the base group and penultimate group each have a tapered configuration, from a largest lowermost outermost section (72l in the first group and 72b in the third), upwardly to a smallest uppermost innermost section (72t in the first group, and 72k in the third) when assembled.

The smallest diameter of the penultimate group is slightly larger than the largest diameter of the first or base group. This is because the penultimate group of rings comprises decreasing diameter ring segments 72b through 72k (the segment 72a of the layer 72 is not shown in FIG. 10, but may be included if so desired), while the largest diameter segment of the first or base group is the next successively smaller segment 72l, with the segments of the first group decreasing in size to the smallest segment 72t. The segments 72b through 72t may be used to form a single group of continuously decreasing diameter segments, or may be used to form more than two different groups of such segments.

The second group comprises the series of segments or rings 74a through 74m, formed from cutting the lower or second layer 74 of the block or sheet 70. The smallest diameter segment 74m abuts the smallest diameter, uppermost segment 72t of the first or base group, with the segments 74a through 74m of the second group being assembled in increasing diameter from the lowermost segment 74m, to the uppermost segment 74a of that group. The uppermost segment 74a of the series cut from the layer 74 of the block 70 of FIG. 9, abuts the largest segment 72b of the segment group formed from the layer 72. (While the largest ring 72a of the layer 72 is omitted in FIG. 10, it will be seen that it would abut the segment 74a if included, resting atop the segment 74a in the manner of the assembly of the structure 10a of FIG. 2.)

It will be noted that the largest periphery of each of the segments 74a through 74m is oriented upwardly, just as when the segments 74a through 74m were cut from the layer 74 of the block 70 of FIG. 9. In other words, the outermost section 74a extends partially above the plane of the next intermediate section 74b, with each successive intermediate section 74c through 74l extending partially above the plane of the next smaller diameter section.

The smallest intermediate section 74l extends partially above the innermost or smallest section 74m, so that all of the sections 74a through 74m taper in width from a largest uppermost outermost section 74a, downwardly to a smallest lowermost innermost section 74m when assembled together.

It will be seen that these segments may be formed with the cuts having the same orientation as the thinner segments 72a through 72t, if so desired, i.e., with the cuts tapering inwardly from bottom to top of the segments. The use of the same orientation may simplify the cutting procedure used in forming the various segments of the present structures constructed according to the present invention. In such a case, the segment group formed need only be inverted to provide the increasing diameter structure from bottom to top, of the third group of segments 74a through 74m.

It will be seen that innumerable variations upon the above described multiple tapered segments and structure formed therefrom, may be developed. For example, the vase structure 70a of FIG. 10 includes an additional group of rings 84a through 84g. These rings may be formed from another portion of the block of material 70 from which the other segments comprising the vase 70a were cut, or from another block of material, as desired. If two or more different blocks of material are used to form a structure according to the present invention, they may be selected to have different colors (or other property/properties) from one another, if so desired. Segments of the two different blocks may be alternated in the construction of a structure, or may be kept together but used to form different colored groups of segments in the structure, as desired.

In FIG. 9, the segments of the first or upper layer 72 are clearly thinner than the segments of the lower layer 74. It will be seen that the aspect ratio (i.e., vertical thickness v. lateral width) may be adjusted as desired, even in the segments of any give group. For example, the segments of the first layer 72 could have been cut so that they increase in lateral width toward the smaller diameter or width segments. It will be appreciated that this would result in a structure having sides with non-linear, variable slopes, as the increasing widths of the smaller sections would result in a greater change in diameter with each successively smaller segment, thus producing a shallower, convex slope as the diameter of the structure decreases. Alternatively, if the widths of the segments were greater with increasing diameters, then the slope of the sides of the structure would vary from a relatively steep slope at a point of smaller diameter, to a shallower concave slope toward the larger diameter.

Such varying lateral width segments may also be used in the construction of structures wherein the segments overly one another, as in the structure 10a of FIG. 2. As in the structure 10a, the vase structure 70a of FIG. 10 may be temporarily assembled by slightly wedging the adjacent segments together, with the segments retaining their positions relative to one another due to their tapered fit. Alternatively, such structures may be permanently assembled by conventional adhesive and/or mechanical means (e. g., glass fiber and resin, etc.), if a permanently assembled structure is desired.

FIGS. 11 and 12 illustrate another embodiment of the present invention, wherein the various segments may be nested together for storage and separated for use as a multiple component device, such as a lifesaving device 86. The device 86 is formed of a series of tapered oval shaped rings 86a through 86e, with a concentric core 86f; other shapes may be formed as desired. The rings 86a through 86e and core 86f are formed from a single sheet of material, in the manner of the segments 72a through 72t and coplanar core 80 of the first layer 72 of the block 70 of FIG. 9. The material used is preferably a buoyant, waterproof material, such as a closed cell foam plastic material; other materials (e.g., balsa, cork, other plastics, etc.) may be used as desired.

In order to preserve the waterproof nature of the material, each of the segments 86a through 86f is preferably covered with a durable, waterproof covering 88, e.g., glass fiber and resin, etc. However, rather than covering the entire assembly and securing each of the components 86a through 86f immovably together, as may be accomplished with various structures constructed according to the present invention in order to provide permanency, the components 86a through 86f are covered separately. The width of the material removed between each of the segments 86a through 86f during the cutting process compensates for the thickness of the covering material, thus allowing the components 86a through 86f to be nested together for storage, as shown in the solid line rendering of FIG. 11.

Each of the sections 86a through 86f includes some means for attaching another article thereto, such as the attachment rings 90a through 90f extending from the bottom of each corresponding section 86a through 86f. Additional rings or other means of attaching articles to the sections, or attaching the sections to one another, may be provided as desired. Each of the rings 90a through 90f has an attachment line and conventional removably connectable link (e.g., snap link, etc.), respectively 92a through 92f, extending therefrom. (Link 92f is shown in the deployed configuration in FIG. 12.) For storage purposes, the lines 92a through 92f may be linked to the ring 90a through 90f of the adjoining section 86a through 86f, with the last line 92f having both ends clipped to its own attachment ring 90f, as shown in FIG. 11.

Deployment of the lifesaving device 86 is illustrated in FIG. 12 of the drawings. In the event of a maritime accident, the series of sections 86a through 86f may be quickly and easily separated, with the respective attachment lines or links 92a through 92e remaining attached to hold adjacent sections together and to preclude their drifting apart. The last line 92f may be used to connect the smallest or core section 86f back to the largest section 86a, thereby forming a closed circular arrangement of the deployed sections 86a through 86f, if so desired. Alternatively, other arrangements may be provided, or one or more sections may be separated from the others and used for the rescue of smaller numbers of persons, as required. FIG. 12 illustrates the general concept, with innumerable variations being possible.

Figure 13:
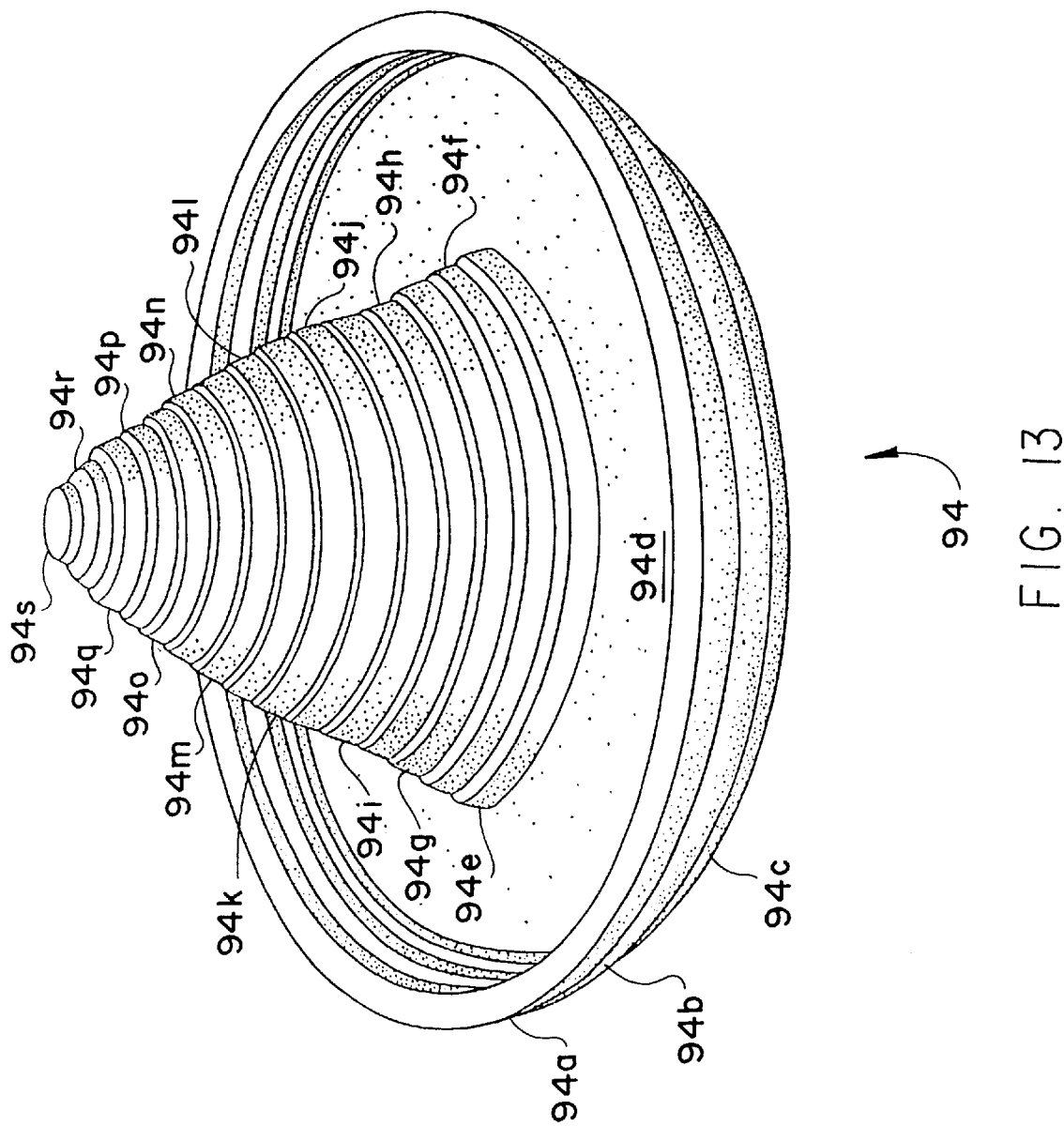
FIG. 13 is a perspective view of a hat-like structure, constructed in accordance with the present inventive method.
Figure 14:
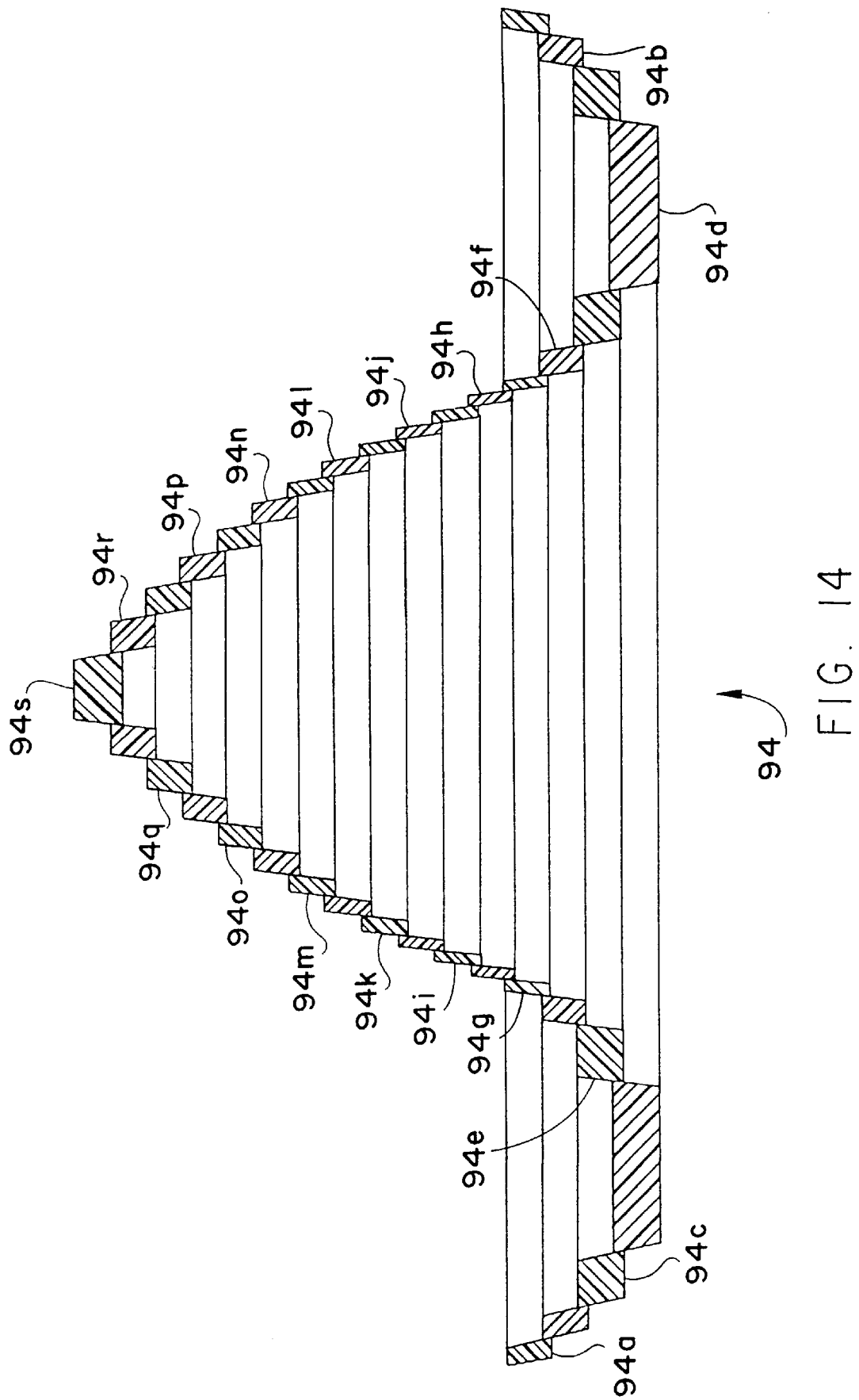
FIG. 14 is an elevation view in section of the hat-like structure of FIG. 13.

Yet another variation on the present invention is illustrated in FIGS. 13 and 14 of the drawings. As described further above, the slope of the sides of an article constructed according to the present invention, may be adjusted as desired by varying the lateral width of selected ones of the various rings or segments used to form the article. Also, it will be seen that a toroidally shaped segment may include both inwardly and outwardly upwardly sloping constructions extending therefrom, if so desired. FIGS. 13 and 14 illustrate such a construction in the form of a sombrero shaped hat-like article 94.

The sombrero 94 comprises a series of ring shaped segments 94a through 94r, from the largest to the smallest diameter, with a central core or crown 94s. The lowermost segment or ring 94d is also the widest, serving as the primary portion of the brim of the sombrero 94 structure. It will be noted that the section 94d has peripheral cuts which are sloped in opposite directions, with the outer peripheral cut angling upwardly and outwardly, and the opposite inner peripheral cut angling upwardly and inwardly. Segments 94a through 94c have parallel inner and outer walls, with their cuts being made parallel to the outer cut of section 94d, while the remaining segments 94e through 94s have walls parallel to the inner wall of section 94d. Thus, when the sections 94a through 94c and 94e through 94s are lifted above the base section 94d, the result is a structure 94 having the appearance of a sombrero, with a raised brim structure comprising sections 94a through 94c and a raised central crown structure comprising sections 94e through 94s.

Additional realism is provided by means of varying the lateral widths of the raised segments of the sombrero structure 94, in the manner described further above for varying the slope of the sides of an article constructed according to the present invention. It will be noted that the outermost segments 94a through 94c decrease in lateral width from segment 94c to segment 94a while retaining the same thickness, as would be the case when all of the segments 94a through 94s are cut from a single sheet having a constant thickness with parallel upper and lower surfaces, as shown in FIGS. 1, 9, and 11. This results in a convex outer slope for the brim area of the structure, with the steepness of the slope increasing as it extends outwardly from the base section 94d to the narrower outermost ring or section 94a.

In a like manner, the four segments 94e through 94h each decrease in lateral width as they progress inwardly. This decrease in width, while maintaining equal height steps, results in an increasingly steep slope from the flat of the lowermost brim portion 94d, upwardly toward the upper portion of the crown of the sombrero 94 structure.

It will be noted that from about segment 94i upwardly to the uppermost crown segment 94s, that the lateral widths of the segments gradually increases with each higher segment. As each successive segment is wider, while maintaining the same increase in height, it will be seen that the slope becomes shallower toward the crown piece 94s. This technique may be used to construct structures having any number of variable slopes, as desired.

The sombrero-like structure 94 of FIGS. 13 and 14 shows a lowermost segment with opposite rising portions, simulating the rising brim and crown of a hat. However, it will be seen that innumerable relatively rising and descending rings may be formed, using the same technique. Such a structure might simulate the rings or ripples in a pool, produced by tossing a stone or the like into the pool. It should also be noted that the sombrero-like structure 94 of FIGS. 13 and 14, is not limited to a circular configuration. Alternative exemplary shapes are shown in FIGS. 5 through 7, with innumerable other shapes being possible.

In summary, the present method of forming expanded structures provides an exceptionally versatile means of forming various types of structures, with the structures being practically unlimited in size, configuration, and use. The relatively compact configuration of a block or sheet of material which has been cut according to the present method, but not yet disassembled into its individual components for expansion, provides for the economical shipment of such condensed, pre-expanded structures from a central location after cutting, with the various sections being separated and assembled by the individual user or purchaser in the field to form a completed structure. As noted further above, such assembled, expanded structures may be made permanent by securing the various segments together conventionally (e.g., adhesive means, etc.) and/or conventionally covering the exterior and/or interior of the structure with glass fiber, synthetic fabric, etc., and coating the covering material with a resin or other suitable material as desired.

The present method lends itself well to the construction of various decorative objects, as well as more utilitarian structures. The pedestal 46 of FIG. 4 has been discussed further above. It will be noted that it is not necessary to assemble consecutive segments of any structure formed in accordance with the present method, from sections cut from a single sheet or block of material. Identical sections may be cut from two different blocks or sheets of material, with the sheets or blocks being differently colored, or differing in some other means. Like sections from alternating blocks may then be assembled to form a structure somewhat like that shown in FIG. 2, with the alternating section lines of the alternating segments representing different color bands, or some other differentiation means. The result will be a strikingly attractive structure which will catch the eye of the observer. Sections may be cut or formed from several differently colored sheets or blocks, if so desired, with various portions of the resulting structure being uniform in color or appearance, or comprising bands of alternating color or appearance, as desired.

It will be further noted that the present method is not limited to the formation of sections each having identical wall thicknesses. By cutting the parent block of material so that various sections have different wall or section thicknesses, it will be seen that the result is a structure having variable wall slopes when assembled, as exemplified by some portions of the structure 46 of FIG. 4. Again, the various sections may be cut from different blocks to provide different colors, if so desired.

The present method may be used with any practicable material, including various species of wood, various types of metal, expanded paper products (i.e., corrugated cardboard), various types of plastics, etc., as desired. However, a foam plastic material (e.g., polyethylene foam) has been found to provide excellent results in testing. Such foam plastic material is relatively inexpensive, very light weight, and is easily shaped to provide the desired exterior shape or configuration.

Such foam plastics are easily and precisely cut as desired, by means of a "hot wire" cutting technique, where an appropriately shaped template is temporarily secured to the opposite surfaces of the uncut block, and a small passage is made through the block adjacent to the corresponding edges of the templates. An electrically resistive wire (e.g., Nichrome, tm) is passed through the hole and drawn tightly between a fixture, and an electrical current is applied to the wire to heat the wire. The hot wire is then drawn along the edges of the two opposed templates, to melt the foam plastic material therebetween to form a precise and fine cut between adjacent sections. Other cutting means may be used as desired (band saw, knife, etc.), depending upon the type of material being cut and the skills and tools available to the craftsman performing the operation. A structure formed of such hot wire cut foam material may be covered with glass fiber and resin, and/or painted and/or otherwise colored or coated as desired, to provide an attractive and durable interior and/or exterior surface as desired.

Thus, the present method of forming expanded structures will provide a most useful means of quickly and inexpensively providing a nearly unlimited variety of hollow structures, limited only by the imagination of the constructor. Structures formed in accordance with the present method will provide a wide variety of utilitarian and decorative structures and objects for users, with the present method lending itself to both finished articles and also to precut articles which may be provided as kits to be completed by the end user. Any embodiment formed according to the present method will prove to be a most valuable asset to the person requiring such an expanded structure.

It is to be understood that the present invention is not limited to the embodiments described above, but encompasses any and all embodiments within the scope of the following claims.

We claim:

1. A method for forming an expanded structure, comprising the following steps:
   (a) providing a solid block of material having a first surface and an opposite second surface substantially parallel to the first surface;
   (b) forming a plurality of concentric sections from the block of material, with the sections comprising an outermost section, an innermost section, and at least one intermediate section, so that the outermost and intermediate sections each have inner walls and the innermost and intermediate sections each have outer walls with first surface peripheries which are smaller than their second surface peripheries;

(c) separating each of the sections from one another; and (d) forming an expanded structure by assembling the sections substantially concentrically with one another, with at least a portion of the innermost section bearing against at least a portion of the at least one intermediate section and at least a portion of the intermediate section bearing against at least a portion of the outermost section.

2. The method for forming an expanded structure according to the method of claim 1, wherein the step of assembling the sections substantially concentrically with one another, comprises placing the sections with at least a portion of the second surface of the innermost section bearing against at least a portion of the first surface of the at least one intermediate section, and with at least a portion of the second surface of the at least one intermediate section bearing against at least a portion of the first surface of the outermost section.

3. The method for forming an expanded structure according to the method of claim 1, wherein the step of assembling the sections substantially concentrically with one another, comprises placing the sections with at least a portion of the outer wall of the innermost section bearing against the inner wall of at least a portion of the at least one intermediate section, and with at least a portion of the outer wall of the at least one intermediate section bearing against at least a portion of the inner wall of the outermost section.

4. The method for forming an expanded structure according to the method of claim 1, wherein the step of assembling the sections substantially concentrically with one another, comprises placing the sections with the innermost section extending at least partially above the at least one intermediate section and the at least one intermediate section extending at least partially above the outermost section, so that the assembled sections taper in width from a largest lowermost outermost section, upwardly to a smallest uppermost innermost section.

5. The method for forming an expanded structure according to the method of claim 1, wherein the step of assembling the sections substantially concentrically with one another, comprises placing the sections with the outermost section extending at least partially above the at least one intermediate section and the at least one intermediate section extending at least partially above the innermost section, so that the assembled sections taper in width from a largest uppermost outermost section, downwardly to a smallest lowermost innermost section.

6. The method for forming an expanded structure according to the method of claim 1, including the step of securing the sections immovably together with one another.

7. An expanded structure, comprising:
a plurality of concentric sections of material, with said sections comprising an outermost section, an innermost section, and at least one intermediate section;
said sections each having a first surface and an opposite second surface, with said second surface being substantially parallel to said first surface;
said outermost section and said at least one intermediate section each having at least an inner wall, and said innermost section and said at least one intermediate section each having at least an outer wall;
each said inner wall and each said outer wall having a first periphery and an opposite second periphery, with said first periphery of each said wall of each of said sections being smaller than said second periphery of said wall of the corresponding said section; and
said sections being assembled substantially concentrically together with one another with at least a portion of said second surface of said innermost section bearing against at least a portion of said first surface of said at least one intermediate section, and with at least a portion of said second surface of said at least one intermediate section bearing against at least a portion of said first surface of said outermost section.

8. The expanded structure according to claim 7, including a plurality of intermediate sections.

9. The expanded structure according to claim 7, wherein said sections are assembled together with one another with said innermost section being above said at least one intermediate section and said at least one intermediate section being above said outermost section, so that said sections taper in width from a largest lowermost outermost section, upwardly to a smallest uppermost innermost section when assembled together.

10. The expanded structure according to claim 7, wherein said sections are assembled together with one another with said outermost section being above said at least one intermediate section and said at least one intermediate section being above said innermost section, so that said sections taper in width from a largest uppermost outermost section, downwardly to a smallest lowermost innermost section when assembled together.

11. The expanded structure according to claim 7, wherein at least some of said sections differ in thickness from at least some other of said sections and said sections define a variable slope when assembled together.

12. The expanded structure according to claim 7, wherein at least some of said sections differ in color from one another.

13. The expanded structure according to claim 7, wherein said sections are immovably secured together.

14. An expanded structure, comprising:
a plurality of concentric sections of material, with said sections comprising an outermost section, an innermost section, and at least one intermediate section;
said sections each having a first surface and an opposite second surface, with said second surface being substantially parallel to said first surface;
said outermost section and said at least one intermediate section each having at least an inner wall, and said innermost section and said at least one intermediate section each having at least an outer wall;
each said inner wall and each said outer wall having a first periphery and an opposite second periphery, with said first periphery of each said wall of each of said sections being smaller than said second periphery of said wall of the corresponding said section; and
said sections being assembled substantially concentrically together with one another with a portion of said outer wall of said innermost section bearing against a portion of said inner wall of said at least one intermediate section, and with a portion of said outer wall of said at least one intermediate section bearing against a portion of said inner wall of said outermost section.

15. The expanded structure according to claim 14, including a plurality of intermediate sections.

16. The expanded structure according to claim 14, wherein said sections are assembled together with one another with said innermost section extending at least partially above said at least one intermediate section and said at least one intermediate section extending at least partially above said outermost section, so that said sections taper in width from a largest lowermost outermost section, upwardly to a smallest uppermost innermost section when assembled together.

17. The expanded structure according to claim 14, wherein said sections are assembled together with one another with said outermost section extending at least partially above said at least one intermediate section and said at least one intermediate section extending at least partially above said innermost section, so that said sections taper in width from a largest uppermost outermost section, downwardly to a smallest lowermost innermost section when assembled together.

18. The expanded structure according to claim 14, wherein at least some of said sections differ in thickness from at least some other of said sections and said sections define a variable slope when assembled together.

19. The expanded structure according to claim 14, wherein at least some of said sections differ in color from one another.

20. The expanded structure according to claim 14, wherein said sections are immovably secured together.

* * * * *